United States Patent [19]

Duehring et al.

[11] Patent Number: 5,236,212
[45] Date of Patent: Aug. 17, 1993

[54] BICYCLE CONSTRUCTION WITH GROOVED STRUCTURAL MEMBER

[75] Inventors: William K. Duehring, Huntington Beach, Calif.; Forrest Yelverton, Longmont, Colo.

[73] Assignee: GT Bicycles, Inc., Huntington Beach, Calif.

[21] Appl. No.: 803,471

[22] Filed: Dec. 3, 1991

[51] Int. Cl.$^5$ .............................................. B62K 19/02
[52] U.S. Cl. .................................................. 280/281.1
[58] Field of Search ..................................... 280/281.1

[56] References Cited

U.S. PATENT DOCUMENTS 4,768,798  9/1988  Reed et al. ...................... 280/281.1

FOREIGN PATENT DOCUMENTS 806530   12/1936  France .............................. 280/281.1
982877    6/1951  France .............................. 280/281.1
2629040   9/1989  France .............................. 280/281.1

OTHER PUBLICATIONS

"Straight Talk on Steel" *Bicycling*, Jul. 1982, pp. 96–123.

*Primary Examiner*—David M. Mitchell
*Assistant Examiner*—Gary C. Hoge
*Attorney, Agent, or Firm*—Stetina and Brunda

[57] ABSTRACT

A bicycle crossbar for attachment between a head tube and seat tube of a bicycle and for providing cable concealment and increased structural integrity to the resultant bicycle frame. The crossbar comprises an elongate, rigid tubular member having a groove formed within and extending longitudinally along the side wall thereof which is sized and configured to accommodate three cables of the bicycle. The crossbar is formed in a manner wherein the side wall, including the groove formed therein, is of greater thickness at its end portions. The crossbar further includes first and second cable receiving members which are rigidly secured within the groove and adapted to facilitate the entrance and exit of the three cables into and out of the groove.

11 Claims, 2 Drawing Sheets

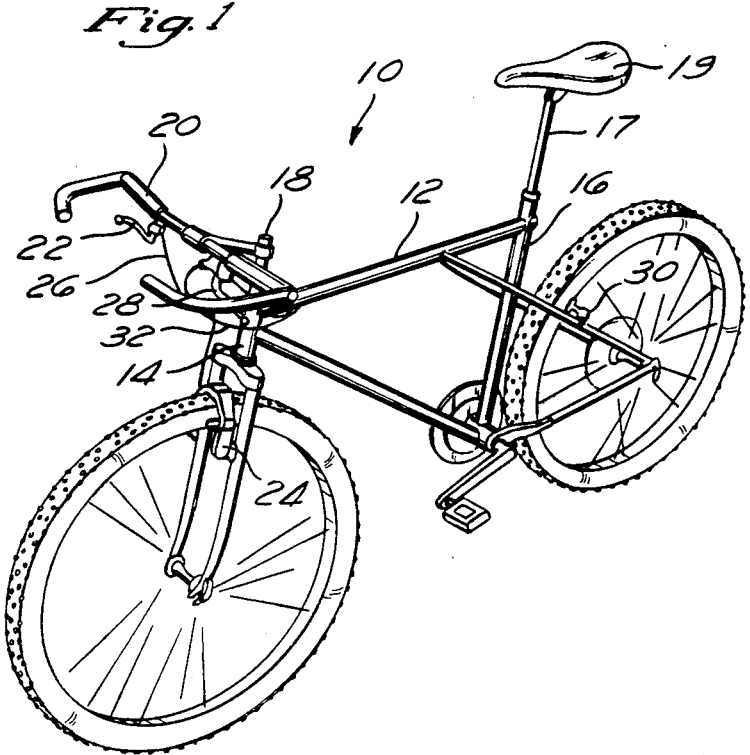
Fig. 1
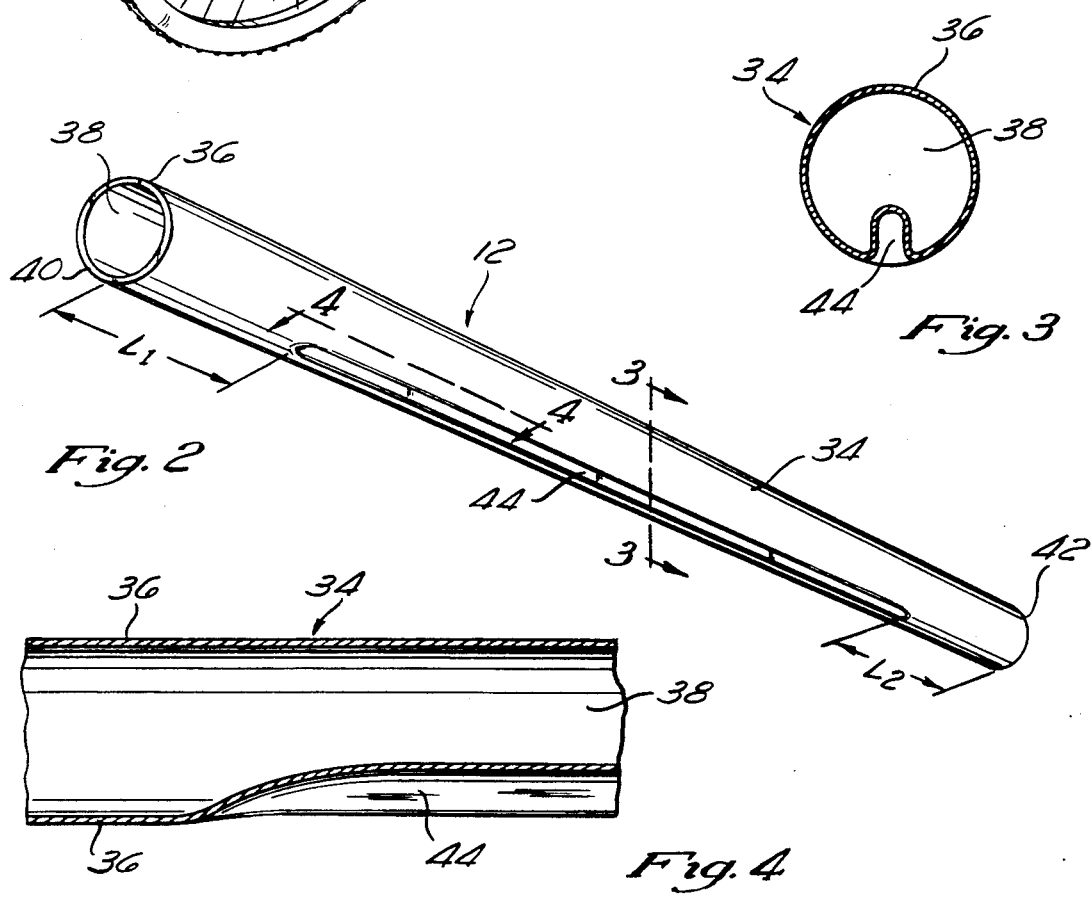
Fig. 2
Fig. 3
Fig. 4

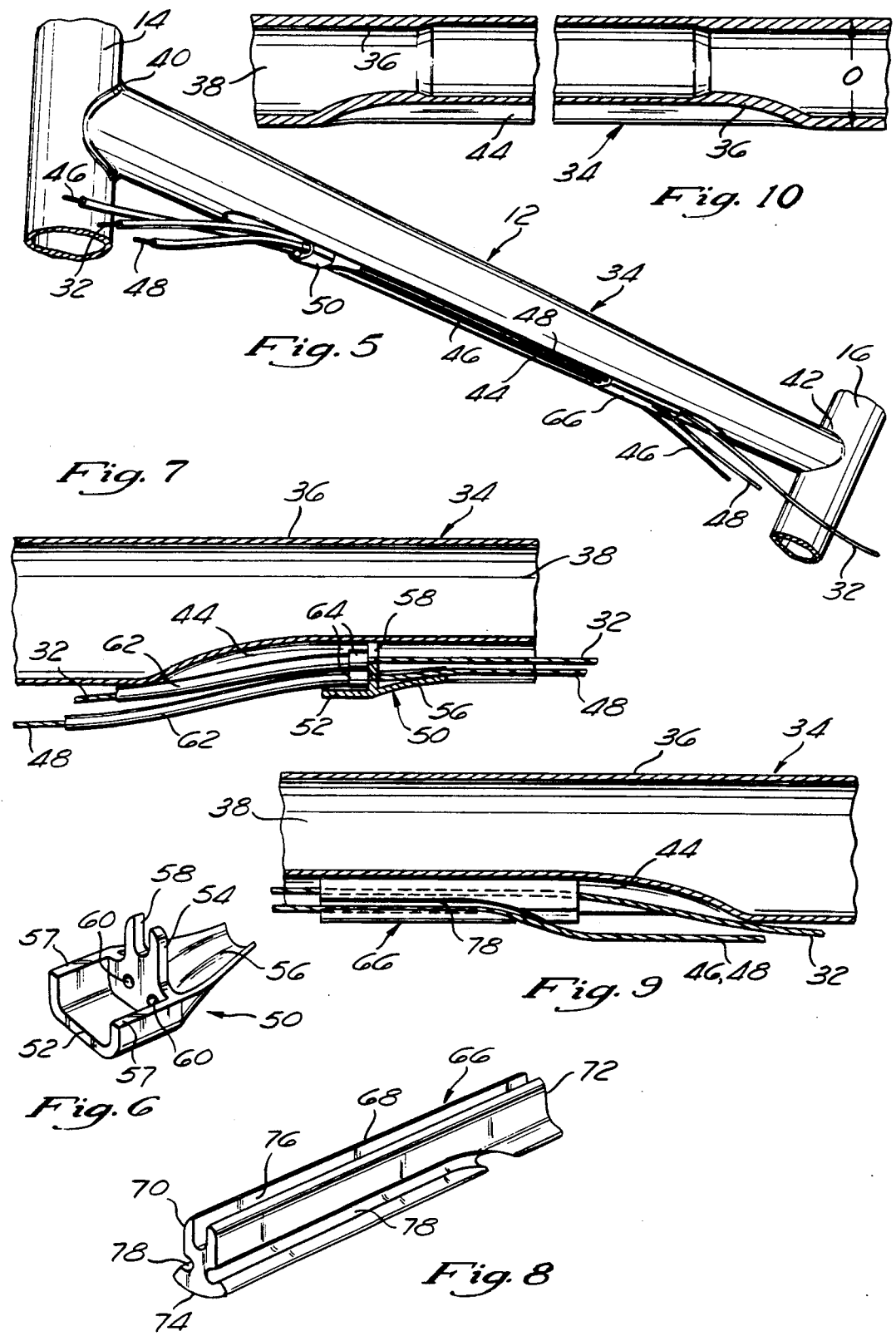

BICYCLE CONSTRUCTION WITH GROOVED STRUCTURAL MEMBER

FIELD OF THE INVENTION

The present invention relates generally to bicycles, and more particularly to a grooved bicycle crossbar for attachment between a head tube and seat tube of a bicycle and for providing cable concealment and increased structural integrity to the resultant bicycle frame.

BACKGROUND OF THE INVENTION

One of the primary structural components of a bicycle is the bicycle crossbar. In typical bicycle construction, the crossbar is rigidly secured to and extends between a head tube of the bicycle and a seat tube of the bicycle. The head tube typically provides a structural base for the stem of the bicycle to which the handle bars are attached. The seat tube provides a base for a seat post which is generally telescopically received therewithin and to which is secured the saddle or seat of the bicycle.

In the construction of multiple speed bicycles, generally three cables extend from the front of the bicycle along the crossbar toward the rear of the bicycle. These cables typically include the rear brake cable, a first shifter cable which is interfaced to the front sprocket derailleur, and a second shifter cable which is interfaced to the rear sprocket derailleur. Typically, the three aforementioned cables are secured either along the top or the bottom of the crossbar via fasteners such as clips. In some prior art bicycles, these cables are inserted through the interior of the crossbar which is typically constructed from cylindrical, tubular stock. In those instances where the cables are attached to the outer surface of the crossbar, the cables are susceptible to damage or breakage and, particularly with mountain bikes, are exposed to substantial amounts of dirt. Additionally, the exposed cables present a safety hazard to the bicycle rider in that the rider's extremities may contact or become entangled in the cables when falling off the bicycle. In those instances where the cables are inserted through the crossbar, apertures must be formed in the head tube, seat tube and/or crossbar components of the bicycle to permit passage of the cables therethrough. As will be recognized, the inclusion of such apertures in the head, seat and/or crossbar tubes diminishes the structural integrity of the resultant bicycle frame.

Additionally, in constructing bicycle frames, it is generally desirable to permanently and rigidly affix the opposed ends of the crossbar to the head and seat tubes through the use of a conventional butt weld or a brazing technique to provide the frame with greater structural integrity. However, such prior art crossbars when formed with apertures or channels to facilitate the brake and sprocket cable transport cannot be affixed to the head and seat tubes through the use of a butt weld or brazing techniques since the crossbars are constructed from tubular stock of insufficient wall thickness to support the use of these attachment methods. The present invention overcomes these and other deficiencies associated with prior art bicycle frame crossbars.

SUMMARY OF THE INVENTION

In accordance with the preferred embodiment of the present invention, there is provided a bicycle crossbar for attachment between a head tube and seat tube of a bicycle and for providing cable storage, i.e. concealment and increased structural integrity to the resultant bicycle frame. The bicycle crossbar generally comprises an elongate, rigid tubular member having a side wall defining a longitudinally extending bore and including a first end for attachment to the bicycle head tube and a second end for attachment to the bicycle seat tube. Formed within the side wall is an elongate groove which extends longitudinally along the underside of the tubular member and is sized and configured to accommodate at least two, and preferably three, bicycle cables, namely the rear brake, front sprocket derailleur, and rear sprocket derailleur cables. In the preferred embodiment, the crossbar is formed in a manner wherein the side wall is double-butted, i.e. having a thicker wall at the end portions and a thinner wall at the middle portion.

The groove formed within the tubular member is sized to terminate a first distance short of the first end of the tubular member and a second distance short of the second end of the tubular member. In the preferred embodiment, the first distance is approximately 4-5 centimeters while the second distance is approximately 4-5 centimeters. Advantageously, by having the groove sized in this manner, the first and second ends of the tubular member may be affixed to the head tube and seat tube by a conventional butt weld or by a brazing technique to facilitate high strength as well as production efficiency.

The crossbar of the present invention further comprises a first cable receiving member which is rigidly secured to the groove in close proximity to the first end of the tubular member and sized and configured to facilitate the entrance of three cables into the groove. In the preferred embodiment, the first member comprises a lower portion having a wall member extending perpendicularly upwardly therefrom. The wall member includes an upper end which is sized to be received within the groove and includes a notch formed therein which is sized to receive one of the three cables. Additionally, disposed within the wall member is a pair of horizontally aligned apertures which are sized and configured to receive second and third cables.

The crossbar further comprises a second cable receiving member which is rigidly secured to the groove in close proximity to the second end of the tubular member and sized and configured to facilitate the exit of the three cables out of the groove. In the preferred embodiment, the second member comprises an elongate body having proximal and distal ends, an upper portion, a bottom surface, and first and second opposed side surfaces. Importantly, the body is sized and configured to be substantially receivable into the groove in a manner wherein the bottom surface is substantially continuous with the outer side wall of the tubular member. Additionally, the second member is oriented such that the distal end is in closer proximity to the seat tube than is the proximal end. Formed within and extending longitudinally through the upper portion is an upper slot which is sized to slidably receive the first cable. A pair of identically configured lower slots are formed within and extend longitudinally along the side surfaces and are sized to slidably receive the second and third cables. In the preferred embodiment, one end of each slot terminates at the bottom surface adjacent the distal end to facilitate the exit of the cables from within the groove.

BRIEF DESCRIPTION OF THE DRAWINGS

These as well as other features of the present invention will become more apparent upon reference to the drawings wherein:

FIG. 1 is a perspective view of a bicycle incorporating a crossbar constructed in accordance with the present invention;

FIG. 2 is a perspective view of the crossbar of the present invention;

FIG. 3 is a cross-sectional view taken along line 3—3 of FIG. 2;

FIG. 4 is a cross-sectional view taken along line 4—4 of FIG. 2;

FIG. 5 is a perspective view illustrating the manner in which the bicycle cables enter into and exit from the groove formed within the crossbar;

FIG. 6 is a perspective view of a first cable receiving member used to facilitate the entrance of the cables into the groove;

FIG. 7 is a cross-sectional view illustrating the manner in which the first member shown in FIG. 6 facilitates the entrance of the cables into the groove;

FIG. 8 is a perspective view of a second cable receiving member used to facilitate the exit of the cables out of the groove;

FIG. 9 is a cross-sectional view illustrating the manner in which the second member shown in FIG. 8 facilitates the exit of the cables out of the groove; and FIG. 10 is a cross-sectional view of the crossbar illustrating the thicker wall regions at the end portions and the thinner wall region at the middle portion.

DETAILED DESCRIPTION OF THE PREFERRED EMBODIMENT

Referring now to the drawings wherein the showings are for purposes of illustrating a preferred embodiment of the present invention only, and not for purposes of limiting the same, FIG. 1 perspectively illustrates a bicycle 10 incorporating a crossbar 12 constructed in accordance with the present invention. In the construction of bicycle 10, the crossbar 12 extends between the head tube 14 disposed at the front end of the bicycle and the seat tube 16 disposed at the rear end of the bicycle. Telescopically received into the seat tube 16 is a seat post 17 having a saddle or seat 19 connected thereto. Connected to the top end of the head tube 14 is the stem 18 to which is attached the handle bars 20. Additionally, connected to the handle bars 20 is a first brake lever 22 which controls the front brake 24 via a first brake cable 26 and a second brake lever 28 which controls the back brake 30 via a second brake cable 32. Though not shown, also connected to the stem 18 is a first shifter which is used to control the front sprocket derailleur of the bicycle via a first shifter cable and a second shifter which is used to control the rear sprocket derailleur of the bicycle via a second shifter cable.

Referring now to FIGS. 2-4, the crossbar 12 of the present invention generally comprises an elongate, rigid tubular member 34 having a side wall 36 defining a longitudinally extending bore 38 extending therethrough. As seen in FIG. 5, the tubular member 34 includes a first end 40 for attachment to the head tube 14 of the bicycle 10 and a second end 42 for attachment to the seat tube 16 of the bicycle 10. In the preferred embodiment, the crossbar 12 is formed in a manner wherein the side wall 36 is "double-butted", i.e. having a thicker wall at the first end 40 and second end 42 of tubular member 34 and a thinner wall in the middle portion of tubular member 34, as seen in FIG. 10. Importantly, by forming the side wall 36 in this manner, the first end 40 and second end 42 may be affixed to the head tube 14 and seat tube 16 via a conventional butt weld or through the use of a brazing technique due to their thickness. Additionally, the double-butted configuration maintains the structural integrity of the tubular member 34 at points of high stress. In those areas of the tubular member 34 where the stresses are smaller, i.e. the middle portion, the side wall is thinner so as to reduce the weight of the crossbar 12. It will be recognized that the thicknesses of side wall 36 as depicted in FIG. 10 have been exaggerated to illustrate the double-butted configuration of crossbar 12.

Formed within the side wall 36 and extending longitudinally along the underside of the tubular member 34 is an elongate groove 44. Groove 44 is sized to terminate a first distance L1 short of the first end 40 of tubular member 34 and a second distance L2 short of the second end 42 of tubular member 34. In the preferred embodiment, the first distance L1 is preferably 4-5 centimeters while the second distance L2 is preferably 4-5 centimeters. Advantageously, by sizing groove 44 in this manner, the first end 40 and second end 42 may be butt welded or brazed to the head tube 14 and seat tube 16 as previously described so as to facilitate high strength as well as production efficiency. To this end, the first end 40 and second end 42 of the tubular member 34 may be contoured so as to be structurally interfaceable to the head tube 14 and seat tube 16, as seen in FIG. 5. The groove 44 is sized and configured to accommodate at least three cables in a manner which will be described in greater detail below. As seen in FIG. 10, the thicker wall sections of the tubular member 34 extend into the area thereof containing the groove 44. Importantly, though groove 44 is formed within the side wall 36 and the side wall 36 is "double-butted", the outer diameter 0 of the tubular member 34 remains constant over its entire length. The crossbar 12 is preferably fabricated from 4130 chromemoly steel, though other materials may be utilized as an alternative.

Referring now to FIGS. 5-9, in constructing the bicycle 10, typically three cables will extend along the underside of crossbar 12 and be received into the groove 44 formed within the tubular member 34. Particularly, these three cables include the second brake cable 32 which is used to interface the second brake lever 28 to the back brake 30 as well as a first shifter cable for interfacing the first shifter to the front sprocket derailleur, and a second shifter cable 48 for interfacing the second shifter to the back sprocket derailleur. As seen in FIG. 5, the cables 32, 46, 48 are received into the groove 44 in close proximity to the first end 40 of tubular member 34 and exit the groove 44 in close proximity to the second end 42 of tubular member 34.

Referring now to FIGS. 6 and 7, to facilitate the entrance of the cables into the groove 44 there is provided a first cable receiving member 50 which is secured to the groove 44 in a position adjacent the end thereof closest to the first end 40 of tubular member 34. In the preferred embodiment, first member 50 comprises a generally U-shaped lower portion 52 having a wall member 54 extending perpendicularly upwardly therefrom. The first member 50 further includes an arcuate portion 56 which is disposed furthest from the head tube 14 when first member 50 is secured to groove 44. The upper end of wall member 54 has a tapered configuration so as to be receivable into the groove 44, with such receipt being limited by the abutment of the upper edges 57 of lower portion 52 and arcuate portion 56 against side wall 36. Disposed within the upper end of wall member 50 is a notch 58 which is sized to slidably receive the second brake cable 32. Also disposed within the wall member 54 is a pair of horizontally aligned apertures 60 which are sized and configured to slidably receive the first shifter cable 46 and second shifter cable 48. As seen in FIG. 7, each of the cables 32, 46, 48 are covered with a coating 62 prior to reaching the first member 50, with such coating 62 ending at adapter members 64 which are abutted against the wall member 54 of the first member 50. As will be recognized, the configuration of the first member 50, and particularly the upwardly slanting, arcuate configuration of the arcuate portion 56, facilitates the smooth entry of the cables into the groove 44. In the preferred embodiment, first member 50 is fabricated from 4130 chromemoly steel, though other materials may be used as an alternative.

Referring now to FIGS. 8 and 9, the exit of the cables 32, 46, 48 out of groove 44 is preferably facilitated by a second cable receiving member 66 which is rigidly secured to the groove 44 in close proximity to the second end 42 of the tubular member 34. In the preferred embodiment, second cable receiving member 66 comprises an elongate body 68 having a proximal end 70, a distal end 72, and a bottom surface 74. Importantly, the body 68 is sized and configured to be substantially received into the groove 44 in a manner wherein the bottom surface 74 is substantially continuous with the outer side wall 36 of tubular member 34. Additionally, the second member 66 is preferably oriented such that the distal end 72 is in closer proximity to the seat tube 16 than is the proximal end 70. Formed within and extending longitudinally through the upper portion of the elongate body 68 is an upper slot 76 which is sized to slidably receive the second brake cable 32. Additionally, formed within and extending longitudinally through the opposed side surfaces of body 68 are a pair of identically configured lower slots 78 which are sized and configured to slidably receive the first shifter cable 46 and second shifter cable 48. As seen in FIG. 8, one end of each of the lower slots 78 terminates at the bottom surface 74 adjacent the distal end 72 of the body 68. As seen in FIG. 9, this particular configuration of the lower slots 78 aids in creating a smooth exit of the first shifter cable 46 and second shifter cable 48 out of the groove 44. In the preferred embodiment, second member 66 is formed of chromemoly steel, though other materials may be utilized as an alternative.

First member 50 and second member 66 are preferably welded to the tubular member 34. Importantly, the first member 50 and second member 66, in addition to facilitating the entrance and exit of the cables into and out of the groove 44, further enhance the structural integrity of the crossbar 12. As will be recognized, by disposing the cables 32, 46, 48 within the groove 44 formed within the crossbar 12, the cables are less susceptible to damage, breakage, or contamination with road dirt. Additionally, since the cables are not disposed through the bore 38 of the tubular member 34 and through apertures out in the head tube 14, seat tube 16 and/or crossbar components, the structural integrity of the entire frame of the bicycle 10 is significantly increased. As will be recognized, such structural integrity is further enhanced by the use of a conventional butt weld or brazing to secure the crossbar 12 to the head tube 14 and seat tube 16.

Additional modifications and improvements of the present invention may also be apparent to those skilled in the art. Thus, the particular combination of parts described and illustrated herein is intended to represent only one embodiment of the invention, and is not intended to serve as limitations of alternative devices within the spirit and scope of the invention.

What is claimed is:

1. A bicycle crossbar for attachment between a head tube and seat tube of a bicycle and for providing cable concealment and increased structural integrity to the resultant bicycle frame, comprising:

an elongate, rigid tubular member having a side wall defining a longitudinally extending bore and including a first end for attachment to said head tube and a second end for attachment to said seat tube; and an elongate groove formed within said side wall and extending longitudinally along the underside of said tubular member, said groove terminating a first distance short of said first end and a second distance short of said second end, and being sized and configured to accommodate at least two cables;

said crossbar being formed in a manner wherein said side wall is of greater wall thickness at said first and second ends.

2. The crossbar of claim 1 wherein said first distance is approximately 4-5 centimeters and said second distance is approximately 4-5 centimeters.

3. The crossbar of claim 1 further comprising:

a first cable receiving member rigidly secured to said groove in close proximity to said first end of said tubular member, said first member being sized and configured to facilitate the entrance of said at least two cables into said groove; and a second cable receiving member rigidly secured to said groove in close proximity to said second end of said tubular member, said second member being sized and configured to facilitate the exit of said at least two cables out of said groove.

4. The crossbar of claim 3 wherein said first and second members are sized and configured to facilitate the entrance and exit of three cables into and out of said groove.

5. The device of claim 4 wherein said first member comprises:

a lower portion;

a wall member extending perpendicularly from said lower portion, said wall member including an upper end sized and configured to be received into said groove;

a notch formed in said upper end of said wall portion, said notch being sized to receive a first cable; and a pair of horizontally aligned apertures disposed within said wall member, said apertures being sized and configured to receive second and third cables.

6. The crossbar of claim 5 wherein said first member is formed of chromemoly steel.

7. The crossbar of claim 4 wherein said second comprises:

an elongate body having a proximal end, a distal end, an upper portion, a bottom surface, and first and second opposed side surfaces, said body being sized and configured to be substantially received into said groove in a manner wherein said bottom surface is substantially continuous with the outer side wall of said tubular member and said distal end is in closer proximity to said seat tube than is said proximal end;

an upper slot formed within and extending longitudinally through said upper portion, said upper slot being sized to slidably receive a first cable; and a pair of lower slots formed within and extending longitudinally along said side surfaces, each of said lower slots being sized to slidably receive second and third cables and having one end terminating at said bottom surface adjacent said distal end.

8. The crossbar of claim 7 wherein said second member is formed of chromemoly steel.

9. The crossbar of claim 1 wherein said tubular member is formed of chromemoly steel.

10. A bicycle crossbar for attachment between a head tube and seat tube of a bicycle and for providing cable concealment and increased structural integrity to the resultant bicycle frame, comprising:

an elongate, rigid tubular member having a side wall defining a longitudinally extending bore and including a first end for attachment to said head tube and a second end for attachment to said seat tube; and an elongate groove formed within said side wall and extending longitudinally along the underside of said tubular member, said groove terminating a first distance short of said first end and a second distance short of said second end, and being sized and configured to accommodate at least two cables.

11. The crossbar of claim 10 wherein said first distance is approximately 4-5 centimeters and said second distance is approximately 4-5 centimeters.

* * * * *